United States Patent
Kissa et al.

(10) Patent No.: US 6,192,167 B1
(45) Date of Patent: Feb. 20, 2001

(54) DIFFERENTIAL DRIVE OPTICAL MODULATOR

(75) Inventors: Karl Kissa, Simsbury; Gregory McBrien, Cromwell; Edward Wooten, Windsor, all of CT (US)

(73) Assignee: Uniphase Telecommunications Products, Bloomfield, CT (US)

( * ) Notice: Under 35 U.S.C. 154(b), the term of this patent shall be extended for 0 days.

(21) Appl. No.: 09/122,598

(22) Filed: Jul. 24, 1998

(51) Int. Cl.[7] .................................................. G02B 6/10
(52) U.S. Cl. ........................... 385/3; 385/2; 385/14
(58) Field of Search .................................. 385/2, 3, 14

(56) References Cited

U.S. PATENT DOCUMENTS

| | | | |
|---|---|---|---|
| 5,005,932 | * 4/1991 | Schaffner et al. | 372/12 |
| 5,101,450 | 3/1992 | Olshansky | 385/3 |
| 5,129,017 | * 7/1992 | Kawano et al. | 385/3 |
| 5,138,480 | * 8/1992 | Dolfi et al. | 385/2 |
| 5,168,534 | * 12/1992 | McBrien et al. | 385/3 |
| 5,208,697 | * 5/1993 | Schaffner et al. | 385/3 |
| 5,214,726 | * 5/1993 | Hockaday | 385/14 |
| 5,303,079 | 4/1994 | Gnauck et al. | 359/188 |
| 5,895,742 | 4/1999 | Lin | 430/321 |

FOREIGN PATENT DOCUMENTS

| | | | | |
|---|---|---|---|---|
| 42 12 372 A1 | 10/1993 | (DE) | | G02F/1/035 |
| 0 819 969 A2 | 1/1998 | (EP) | | G02F/1/035 |
| 1625229A1 | * 8/1992 | (SU) | | 385/2 |

OTHER PUBLICATIONS

Osamu Mikami, et al., "Phase Tuning in Optical Directional Coupler", Appl. Phys. Lett., vol. 29, No. 9, pp. 555–556, Nov. 1976.*

I.P. Kaminow, et al., "Efficient Strip–Waveguide Modulator", Appl. Phys. Lett., vol. 27, No. 10, pp. 555–558, Nov. 1975.*

* cited by examiner

*Primary Examiner*—Cassandra Spyrou
*Assistant Examiner*—John Juba, Jr.
(74) *Attorney, Agent, or Firm*—McCormick, Paulding & Huber LLP (57) ABSTRACT

A differential input optical modulator, suited for an electrical driver with complementary outputs is provided by the present invention. One embodiment uses a X-cut LiNbO3 substrate, with or without a buffer layer, to reduce cost of manufacture in comparison to some known devices that employ a Z-cut LiNbO~ substrate. These prior art devices require both buffer and charge bleed-off layers. The present invention also includes a quasi-symmetric electrode structure in which the applied fields run parallel to the surface of the substrate.

28 Claims, 7 Drawing Sheets

DIFFERENTIAL DRIVE OPTICAL MODULATOR

TECHNICAL FIELD

This invention relates generally to optical modulators as used in optical communication systems and more particularly to differentially driven optical modulators compatible with low voltage modulation signals.

BACKGROUND OF THE INVENTION

Optical modulators are needed for external modulation of light in the medium and long haul telecommunication markets. Dense Wavelength Division Multiplexing (DWDM) allows for more than 40 times multiplication of the system's signal carrying capacity. Reduction of cost per DWDM channel provides a competitive edge for telecommunication equipment manufacturers. Each channel requires a modulator and suitable electrical RF driver. Modulators have been developed that require switching signals of only 2–3V, enabling the use of low cost electrical drivers as a source of input modulation signals. These sources are also characterized by low power dissipation.

Lithium niobate (LiNbO3) and semiconductor versions of low switching voltage modulators are available. Lithium niobate devices use the electro-optic effect to generate phase modulation inside a Mach-Zehnder Interferometer (MZI), while semiconductor devices either use either phase modulation inside of an MZI, or amplitude modulation directly via the Electroabsorption (EA) effect. The properties of the Multiple Quantum Well (MQW) structures within the semiconductor devices have an inherent wavelength dependence that is much larger than that observed with lithium niobate. The tight process control needed to make the semiconductor devices suitable for DWDM applications is difficult to achieve, thereby making them either unavailable or unsuitable for many applications of medium distance and long haul DWDM. Low switching voltage lithium niobate devices are inherently broadband vs. wavelength, though, tend to have higher cost when compared to semiconductor modulators, due to the smaller number of devices per wafer.

U.S. Pat. No. 5,303,079 discloses a device in which external modulation is accomplished in a dual waveguide device wherein substantially identical input optical beams are supplied to the waveguides and wherein each waveguide through its electrode is subject to individual, mutually exclusive control. Modulation signals are applied to each waveguide via its separate electrode. Control signals are applied to each waveguide for adjusting the modulation chirp parameter to a desired fixed, non-zero value. Modulated lightwave signals emerging from the waveguides are combined to form a single output signal suitable for transmission over an optical fiber. However, the '079 device, initially intended for producing controlled chirp, was made in Z-cut LiNbO3, and was found to have efficiency adequate for use with low cost electrical drivers. In addition, its properties are inherently wavelength independent, therefore, it is more suitable for use in DWDM applications. However, the '079 device requires buffer and charge bleed-off layers, which increase the cost of manufacture.

A traveling wave optical modulator on X-cut lithium niobate is disclosed in U.S. Pat. No. 5,138,480. The impedance of a traveling wave optical modulator may be increased to a desired input impedance without adversely affecting the drive voltage or velocity matching of the modulator. This is accomplished in the '480 device by reducing the width of the ground electrodes to not more than 3 times the width of the hot electrode.

Optical communication methods and apparatus are disclosed in U.S. Pat. No. 5,101,450 for transmitting two or more optical signals with different optical carrier frequencies on a single optical fiber with high spectral efficiency. Each optical carrier is modulated with multiple modulated subcarriers. An optical phase modulator provides cancellation of second order intermodulation products in each optical signal, thereby permitting the optical carrier frequencies to be spaced by $2f_{max1}$ where $f_{max}$ is the maximum modulation frequency. In another embodiment, a single sideband optical phase modulator provides cancellation of second order intermodulation products and one signal sideband, thereby permitting the optical carrier frequencies to be spaced by $f_{max}$.

The prior art includes devices that use an Electro-Absorption (EA) or Mach-Zehnder Interferometer (MZI) optical modulator, fabricated on a semi-conducting substrate like InP. The drive voltages of these semi-conductor devices are compatible with lower cost electrical drivers, which have output voltages of approximately 2 volts. However, the EA devices suffer from chirp induced in the optical wavelength during the transition from the ON to OFF state. The properties of both EA and MZI semiconductor devices are also inherently wavelength dependent, and therefore both are difficult to manufacture for applications, such as Dense Wavelength Division Multiplexing (DWDM), where the wavelength of operation must be tightly controlled.

SUMMARY OF THE INVENTION

An object of the present invention is to provide an optical modulator for use in optical communication systems that has differential inputs.

Another object of the present invention is to provide an optical modulator of the foregoing type which is compatible with a low cost, low voltage output electrical driver having complementary outputs.

Yet another object of the present invention is to provide an optical modulator of the foregoing type which allows the use of X-cut LiNbO3 substrate, instead of Z-cut LiNbO3 substrate.

Still another object of the present invention is to provide an optical modulator of the foregoing type which has eliminated buffer and charge bleed-off layers found in prior art devices.

Another object of the present invention is to provide an optical modulator of the foregoing type which is characterized by reduced manufacturing costs.

According to one aspect of the present invention, an electro-optic modulator for use in an optical communication system having an optical signal transiting therethrough has an electro-optic substrate with an electro-optic axis oriented parallel to an upper surface of the substrate. There is an optical waveguide adapted to receive the optical signal which is formed in the upper surface of the substrate. The optical waveguide has first and second legs spaced from one another. There are first and second input electrodes formed on the substrate upper surface, with each of the input electrodes configured to be in electro-optic communication with a corresponding one of the optical waveguide legs, but which is substantially misregistered thereto. The modulator also includes first and second ground electrodes formed on the substrate upper surface spaced from a respective one of said input electrodes and configured to be in electro-optic communication with a corresponding one of the optical waveguide legs, but which is substantially misregistered thereto.

According to another aspect of the present invention, an electro-optic modulation apparatus for modulating an optical signal transiting through an optical communication system includes an optical modulator having electro-optic substrate with an electro-optic axis oriented parallel to an upper surface of the substrate. There is an optical waveguide adapted to receive the optical signal which is formed in the upper surface of the substrate. The optical waveguide has first and second legs spaced from one another. There are first and second input electrodes formed on the substrate upper surface, with each of the input electrodes configured to be in electro-optic communication with a corresponding one of the optical waveguide legs, but which is substantially misregistered thereto. There are first and second ground electrodes formed on the substrate upper surface spaced from a respective one of said input electrodes and configured to be in electro-optic communication with a corresponding one of the optical waveguide legs but which is substantially misregistered thereto. The apparatus also includes an interface structure for receiving modulation signals for modulation the optical beam. The interface structure is configured to be in electrical communication with the optical modulator first and second input electrodes.

DESCRIPTION OF THE PREFERRED EMBODIMENT

Figure 1:
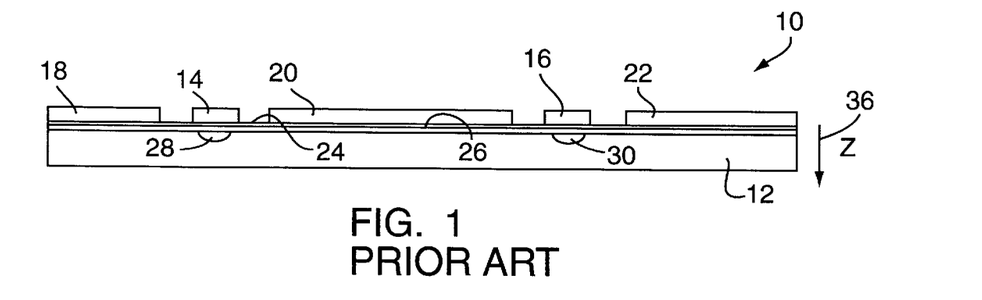
FIG. 1 is a simplified schematic illustration of a prior art optical modulator having a Z-cut lithium niobate substrate.

As noted above, lithium niobate (LiNbO3) and semiconductor versions of low switching voltage optical modulators are available. Low switching voltage lithium niobate devices are inherently broadband vs. wavelength, though tend to have higher cost when compared to semiconductor optical modulators due to the smaller number of devices per wafer. A cross-section of a prior art optical modulator 10 is shown in FIG. 1 in simplified schematic form.

The optical modulator 10 is fabricated on a Z-cut LiNbO3 substrate 12 and is operated by low voltage switching (modulation) signals received at input electrodes 14 and 16. Ground electrodes 18, 20, 22 are also included in the prior art optical modulator 10. Also included in the device are charge dissipation layers 24 and buffer layer 26 both fabricated on an upper surface of the substrate and underneath the electrodes. There is also optical waveguides 28, 30 formed in registration with the electrodes 14 and 16.

Figure 2:
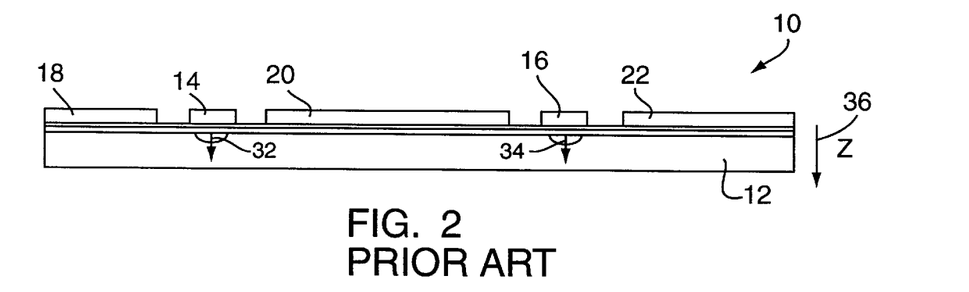
FIG. 2 is another view of the optical modulator of FIG. 1 showing directions of applied field responsible for modulation.

The applied fields 32, 34 responsible for modulating (via the electro-optic effect) the applied optical signal that traverses the waveguides are shown schematically in FIG. 2. These fields run parallel to the crystal Z axis 36 and have the directions respectively shown by the arrows.

Figure 3:
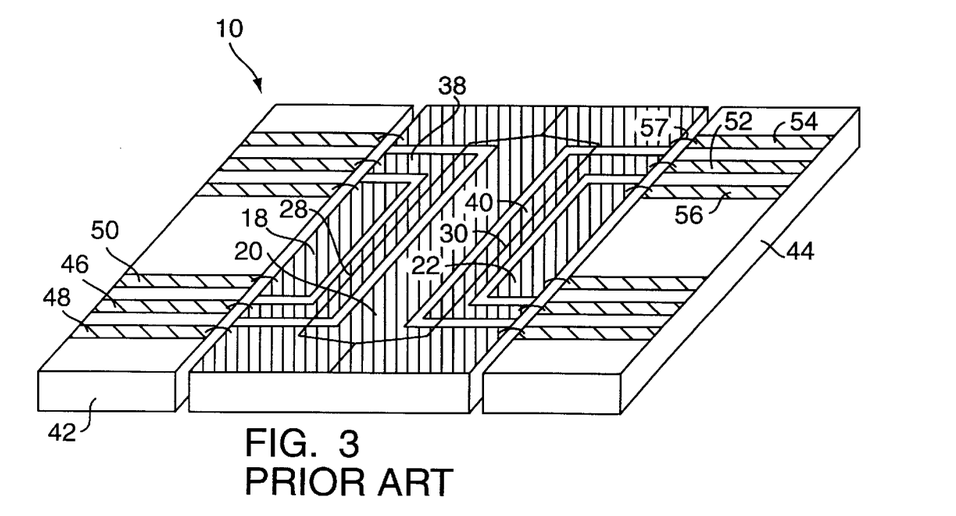
FIG. 3 is a top view of the optical modulator of FIG. 1 showing electrical signal routing from opposite sides of the substrate.

A top view of the optical modulator 10 is shown in FIG. 3. The optical modulator 10 features two input electrodes, 38 and 40, making the devices compatible with drivers having complementary outputs. Also visible in FIG. 3 are RF interface structures 42, 44 disposed on adjacent sides of the optical modulator 10. Each RF interface contains an RF conductor. Interface structure 42 has conductor 46 and grounds 48 and 50; with interface structure 44 having conductor 52 and grounds 54, 56. Each conductor is adapted to establish either a ground connection or present one of the input modulation signals to the optical modulator 10 by way of wire bonds 57. The optical modulator 10 is highly symmetric, with the input ("hot") electrode for each received modulation signal on top of an optical waveguide. Each optical waveguide forms one arm of an MZI. The placement of each hot electrode directly above the waveguide results in concentration of the vertical field flux in the waveguide, making possible the low switching voltage of the input modulation signal.

Note that the direction of the vertical field generated in each of the waveguides shown in the optical modulator of FIGS. 1–3 is the same for both input electrodes. That is, a positive voltage on either driven generates a field oriented the same way relative to the crystal Z axis, which is perpendicular to the surface of the device. This symmetry of applied field is critical in order for the device to be compatible with electrical drivers having complementary outputs. Unlike other single input devices (either X or Z cut), the push-pull effect in the MZI is created by the electrical driver, rather than by electrode polarity. The time varying components of the applied voltages are equal in amplitude, but opposite in polarity for the two input signals.

Another feature of prior art optical modulators is evident in FIG. 3. The electrical signals are fed symmetrically from opposite sides of the integrated optic device. This symmetry provides assurance that electrical pulses entering the two inputs reach the MZI at the same time. Any mismatch in timing causes one arm of the MZI to receive a pulse before the other arm, causes a momentary imbalance in the voltage magnitude of the applied input signal. This momentary asymmetry results in a net momentary phase modulation at the output of the device, or chirp, which is deleterious to the quality of the optical signal at the receiver. The rising and falling edges of the pulse are broadened, as well.

Optical modulators which are compatible with low voltage drivers are encumbered by other burdens. The known optical modulators which employ a Z-cut LiNbO3 substrate require the use of a buffer layer to prevent optical losses from electrode loading, and a charge dissipation layer in order to prevent drift-over time in the quiescent operating (bias point) of the interferometer. Both buffer and charge dissipation layers increase the optical modulator's cost of fabrication. In addition, a Z-cut LiNbO3 substrate poses technical challenges in manufacturing the optical modulator. The pyroelectric effect creates charge build up on the top and bottom surfaces of lithium niobate substrates cut at this orientation during manufacture of the optical modulator.

In addition, the opposed orientation of the input electrodes typical of the prior art is inconvenient for design of the remainder of the optical transmitter, and requires a great deal of precious space within the transmitter due to RF signal routing issues. Typically, the complementary output electrodes of the electrical driver circuitry which generates the input modulation signals are physically close to each other. Signals from those output electrodes must be routed to the input electrodes on the optical modulator, which are spaced much further apart. The transit time for these electrical signals must be matched for the same reasons set forth above, which requires that an extra delay for the modulation signals must be inserted into one of the lines for the input electrodes. This extra delay wastes space on the transmitter card associated with the optical modulator, and increases the overall size of each transmitter card.

The present invention, in contrast, provides a lower cost solution for the telecommunication equipment manufacturer by allowing the device to be realized with X-cut instead of Z-cut LiNbO3 substrates. The use of an X-cut LiNbO3 substrate eliminates the need for buffer layers for 2.5 Gb/s optical modulators and charge dissipation layers for both 2.5 and 10 Gb/s modulators. Wafer processing is simplified as well.

Figure 4:
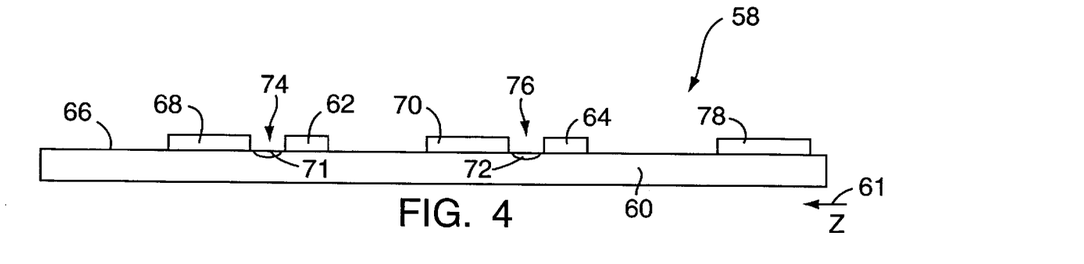
FIG. 4 is a simplified schematic illustration, in section, of an optical modulator made in accordance with the present invention.

A simplified schematic illustration, in cross section, of a preferred embodiment of the present invention is shown in FIG. 4. An optical modulator 58 includes an X-cut lithium niobate substrate 60 with the direction of the Z crystallographic axis indicated at 61. There are first and second input electrodes 62, 64 formed on an upper surface 66 of the substrate. Ground electrodes 68, 70 are provided on the upper substrate surface spaced from and adjacent a corresponding input electrode. Optical waveguides 71, 72 are formed in the substrate for carrying an input optical signal. Unlike prior art optical modulators, the optical waveguides of the present invention are misregistered with the input electrodes to be substantially aligned with a spaced region 74, 76 between the input and ground electrodes. Supplemental ground electrode 78 is also fabricated on the substrate surface at a preselected distance from input electrode 64. The supplemental electrode is, as detailed hereinafter, optional, but is included in certain embodiments dependent on the application.

Figure 5:
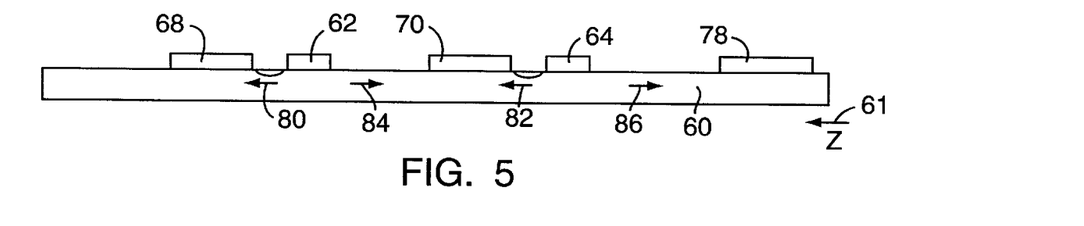
FIG. 5 is another simplified schematic illustration of a the optical modulator of FIG. 4 showing the direction of the applied fields within a waveguide in the device substrate.

Referring now to FIG. 5, the optical modulator of FIG. 4 is seen again in section. Arrows 80, 82 show the direction of the field in the substrate applied by the modulation signal to the input electrode. Arrows 84, 86 indicate the direction of the weaker, fringing fields between the input electrode and its adjacent ground electrode. The electro-optically active Z axis 61 runs laterally for X-cut devices, thereby enabling efficient modulation by electrodes alongside of the waveguide without the use of a buffer layer. Most of the applied field flux runs between the input and closest adjacent ground electrode. The concentration of field flux between two electrodes allows for an electrical impedance in the 30–40 Ohm range, which is higher than the 20–25 Ohm typical of conventional X-cut coplanar waveguide (CPW) electrodes used for single input X-cut 2.5 Gb/s optical modulators. The higher impedance is compatible with low cost electrical driver circuits having complementary output electrodes, not shown in the drawing.

The supplemental ground electrode shown in FIG. 5 balances electrical impedances for the two input electrodes. Some of the fringing field lines from the input electrode 62 reach the ground electrode to its right. The extra flux leaving that input electrode increases capacitance per unit length; resulting in slightly lower electrical impedance for that input, as compared to an isolated input and a ground electrode. The supplemental ground electrode draws some fringing field from input electrode 64, lowering its impedance in order to match the impedance of the other input electrode. Balanced electrical impedances assure that modulation efficiency is the same for both input electrodes of the modulator, at all frequencies, in order to prevent chirp of the light.

Figure 6:
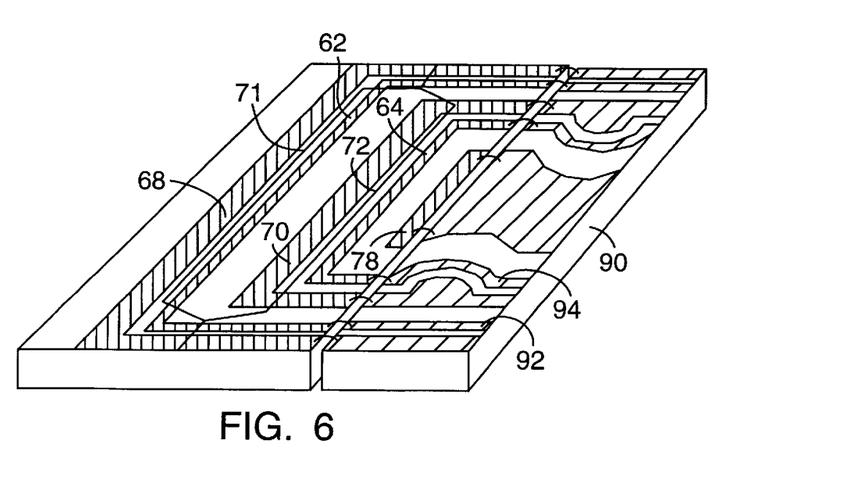
FIG. 6 is a simplified schematic illustration of the optical modulator of FIG. 4 showing the same side routing of the input electrical signals.

In FIG. 6 there is seen simplified schematic illustration of the optical modulator of FIG. 4 showing the same side routing of the input electrical signals. Visible in FIG. 6 is RF interface structure 90 which is similar in function to interface structures in prior art devices in that input signals to the input electrodes are prepared for presentation to the optical modulator itself. Note, however, that the present invention allows for elimination of one of the RF interface structures required by prior art optical modulators. Carefully chosen electrical path length imbalance in input electrodes 92, 94 of the RF interface structure compensates for path length imbalance in the integrated optic device, in order that (RF) modulation signals arrive at the MZI at the same time.

In a separate embodiment of the present invention, dual drive functionality is achieved by two sets of CPW electrodes, which are optically in series, but driven independently from the two RF input electrodes. The RF modulation signal from one input is fed to the center conductor of the first set of electrodes. The RF signal from the other input is fed to the outer conductors of the second set of electrodes.

Figure 7:
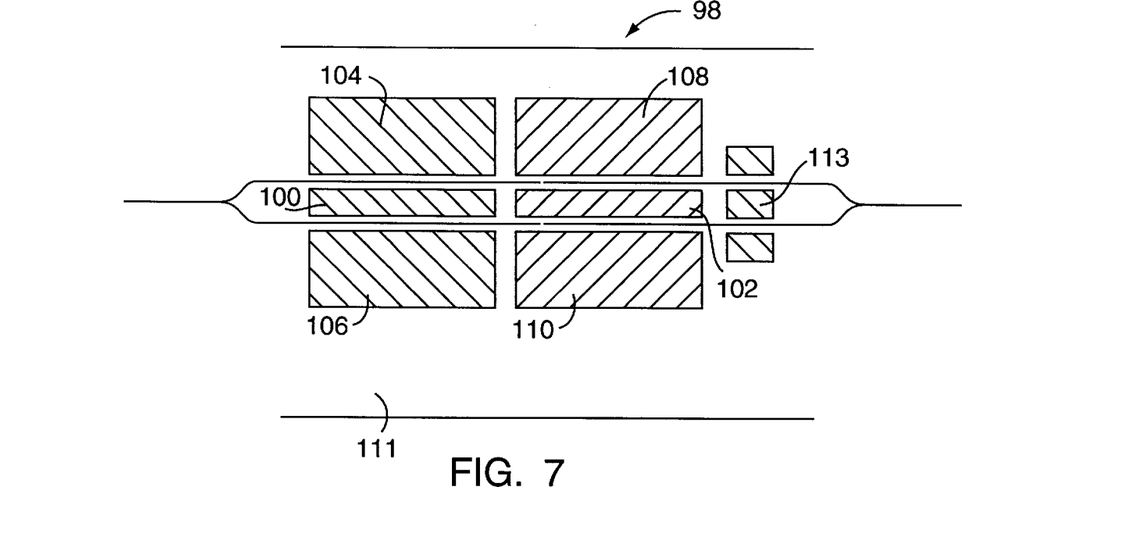
FIG. 7 is a simplified schematic illustration of an alternative embodiment of an optical modulator provided by the present invention.

FIG. 7 is a simplified schematic illustration of an alternative embodiment of an optical modulator provided by the present invention. The optical modulator 98 is adapted to receive differential drive (input modulator signals) at two CPW electrodes in series 100, 102. Ground electrodes 104, 106 are adjacent electrode 100, while ground electrodes 108, 110 are adjacent electrode 102. These electrodes are all fabricated in parallel on a X-cut LiNbO3 substrate 111. The electrodes are driven synchronously, but with complementary data content in each modulator signal.

In this embodiment, the second input electrode is driven with a complementary input signal to the first electrode, but delayed by the time required for the light to travel from the beginning of the first electrode to the beginning of the second electrode. The delay is easily produced by a short piece of transmission line (not shown), the inclusion of which could be accomplished by the user. Alternatively, a stripline delay may be packaged with the optical modulator. Attenuation and dispersion of the modulation signals caused by the stripline are negligible.

Table 1 outlines the parameters for two possible configurations of the optical modulator 98; one with buffer layer and one without, $UTP_1$ and $UTP_2$, respectively. Also set forth in table 1 are the characteristics of the a prior art device sold by Lucent Technologies. The drive voltage and power for each modulator input signal are given as $V_{\pi/2}$ and $P_{\pi/2}$ since each electrode only needs to produce a $\pi/2$ phase shift. The drive power is given simply as $P_{\pi/2}=V^2\pi/2/4Z$ and assumes no loss from the connector to the electrode. The reflected power $S_{11}$ is calculated assuming a straight 50 ohm stripline (which presents the input modulation signal to the electrode) and matched impedance termination so the only signal reflection is from the stripline-electrode interface. In certain applications a tapered stripline would be employed to transform impedances so $S_{11}$ would be improved.

TABLE 1

| Vendor | Electrode Length (mm) | Buffer Thickness (mm) | $V_{\pi/2}$ (V) | Electrode Imped. (ohms) | $S_{11}$ (dB) | $P_{\pi/2}$ (mw) |
|---|---|---|---|---|---|---|
| Lucent | | | 2 | 43 | <22 | 23 |
| $UTP_1$ | 6.5 | 0 | 3–4 | 25 | −9.5 | 90–160 |
| $UTP_2$ | 21 | 1.3 | 4–5 | 38 | −17 | 100–160 |

The electrode length for an optical modulator 98 with no buffer layer is chosen to give 3 dB rolloff at 12.5 GHz. The electrode length for an optical modulator 98 with a buffer layer was chosen to be as long as possible for a 65 mm length substrate while still allowing room for a bias electrode, Y-branches, and spatial mode filters which may be employed in the circuit. For the above embodiment, the buffer layer thickness was chosen to give 3 dB rolloff at 12.5 GHz.

It is probably best to use $P_{\pi/2}$ as the figure of merit when comparing optical modulators with different electrode impedances because $V_{\pi/2}$ is the voltage on the input electrode, not at the connector from the modulator signal source. Due to the higher drive powers required by the optical modulator 98, several adaptations may be necessary to include the optical modulator 98 in a current production optical system. When compared to standard devices, the main advantage of optical modulator 98 is the reduced drive voltage. A disadvantage is the requirement for two complementary input signals.

Figure 8:
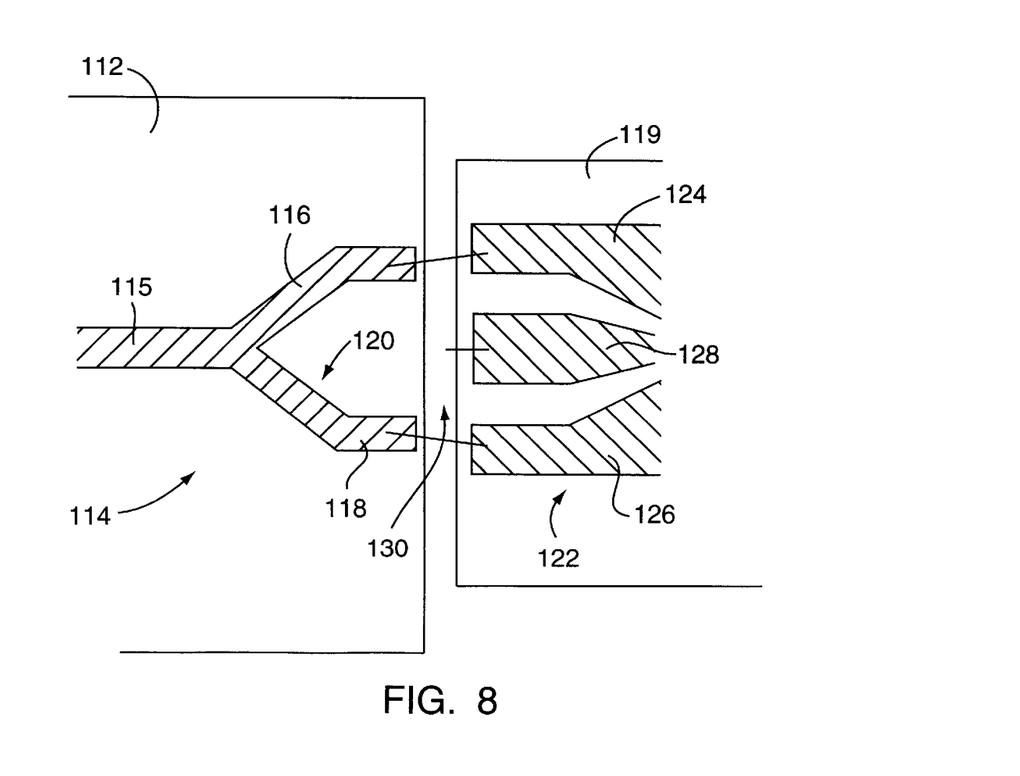
FIG. 8 is a simplified schematic drawing showing a portion of signal inverting stripline feed apparatus used with the optical modulator of FIG. 7.

The optical modulator 98 with no buffer layer uses the input electrodes for biasing, as does several prior art devices, whereas the optical modulator 98 with a buffer layer requires a separate bias electrode 113. For applications where it is desirable to make the logic polarity identical to known devices, the polarity of the second input electrode could be inverted using a stripline feed as shown is FIG. 8. A modulation signal is presented on main input electrode 115 (a microstrip) which is configured on interface structure 112. Stripline feed 114 includes two legs 116, 118 separated by region 120. Legs 116 and 118 are electrically connected to input electrode 122 on substrate 119. Input electrode 122 is comprised of two legs 124, 126 which are separated by ground 128. Electrical connection between the electrodes on the substrate and their corresponding elements on the interface structure or the package are accomplished by conventional wire bonds 130.

Certain prior art devices can alter characteristic signal chirp by varying the ratio of the drive levels to the two electrodes. This feature can be included with the optical modulator 98 by making the two input electrodes display opposite chirp. When the drive levels for the modulator signals are equal, the total chirp would be zero. The chirp displayed by the optical modulator 98 is varied by changing the ratio of modulator signal drive levels.

An optical modulator provided according to the present invention reduces the cost of manufacturing a differential input optical modulator which is compatible with a low cost, low voltage output electrical driver having complementary outputs. Cost reduction is achieved, in part, by eliminating the need for buffer and charge bleed-off layers.

The embodiments of the present invention have many distinguishing features compared to the prior art. There are at least four electrodes utilized in these embodiments; ground-input signal-ground-input signal, or input signal-ground-input signal-ground. A gap between the second and third electrodes is provided of a magnitude adequate to minimize fringing fields between those electrodes. As a result field overlap is optimized with the corresponding waveguide, and the circuit displays higher, more ideal electrode impedance.

An impedance balancing fifth electrode can be included to balance the amount of fringing field flux, causing the electrode impedance for two RF inputs to be identical. The present invention allows both input electrodes to the integrated optical modulator and device package to be placed on the same side, thereby enhancing the compactness of the overall device. Another feature of the present invention allows the addition of length to the impedance matching structure between the connectors on the housing and the modulator in order to equalize the connector to Mach-Zehnder RF transit time.

The present invention is readily distinguishable over the prior art. The device of the '079 device requires buffer and charge dissipation layers, neither of which the present invention needs. The '450 patent describes independent modulation of two arms of a Mach-Zehnder Interferometer (MZI). However, inspection of FIGS. 5, 6, 16, 17 and 18 reveal differences between the devices of that patent and the invention. On page 7 the '450 patent teaches that in FIGS. 5 and 6, the center electrode is grounded, while signals are applied to the outside electrodes.

The '450 electrode structure cannot be used to generate intensity modulation with net zero phase modulation. If an electrical driver with complementary outputs is used as the modulation signal source, the push-pull nature (opposite polarity) of the applied voltages will be canceled by the opposite polarity of the applied fields with respect to the crystal axis. The applied fields corresponding to the two applied signals in the invention have the same polarity and magnitude relative to applied voltage, in order that the push-pull drive voltages produce a net phase difference in the arms Mach-Zehnder. Using one of the other electrodes in Olshansky's patent as a ground electrode might result in a device that produces intensity modulation. However, in this case the phase modulation in the two arms of the MZI are different in magnitude, due to the lack of symmetry. This results in a net phase modulation at the output of the device, and therefore chirp, which can be deleterious to system performance.

The electrode structure (ground-input electrode-ground-input electrode-ground) of the invention requires the use of a narrower than normal ground electrode, due to the close spacing of the waveguides. One skilled in the art would postulate that the narrower ground might lead to extra loss of RF modulation signal as it propagates down the traveling wave electrode. Note however that the '480 patent discloses a device using a conventional three electrode (ground-input electrode-ground) structure with narrow ground. No RF propagation penalty is described in the patent. However, the '480 devices are preferably built with electrodes whose lengths are too short to incur loss in modulation signal due to the narrow ground electrode.

Moreover, the '480 patent does not teach or suggest the more complicated electrode structure employed by the present invention. The choice of the ground width in the present invention can be a compromise between minimizing RF signal propagation loss, which is reduced as the ground electrode widens, and minimizing fringing fields which strengthen as the ground electrode widens. See FIG. 5 of the present invention. There is no recognition of this problem in the '480 patent.

The present invention can be manufactured at lower cost due to the quasi-symmetric design, which allows the use of an X-cut LiNbO3 substrate, instead of a Z-cut LiNbO3 substrate. An optical modulator having an X-cut LiNbO3 substrate may or may not need a buffer layer depending on speed of operation and does not need a charge bleed-off layer on the waveguide surface. An optical modulator having an Z-cut LiNbO3 substrate always requires a buffer layer and charge dissipation layer between the electrodes and optical waveguide, both of which increase cost of manufacture. In addition, fabrication of devices with Z-cut LiNbO3 is more problematic, and therefore more costly, due to charge build-up on +/−Z faces.

Devices with conventional Coplanar Waveguide (CPW) electrodes, such as those shown in FIGS. 1–3, have relatively wide ground electrodes that have (1) low resistance to RF current and (2) high capacitance between each other. These two characteristics reduce the possibility of parasitic RF modes propagating in the device.

Parasitic modes in the modulation signal occur when the voltage on one or more ground electrode(s) becomes different from the voltages on other ground electrodes or the voltage on the metal walls of the device package. This non-ideal grounding causes the ground electrodes to behave like hot electrodes, allowing RF energy to propagate in them that normally would not be present.

Figure 9:
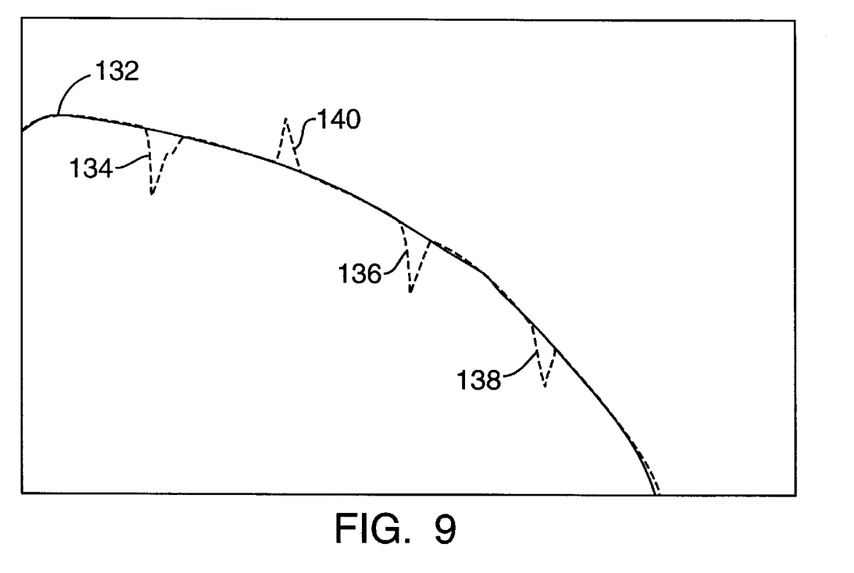
FIG. 9 is a diagrammatic illustration depicting desired and undesired modulation response as a function of frequency in the modulation signal for the optical modulator of FIG. 4.

Grounding wire bonds at the front and back ends of a device such as wire bonds 57 actually reflect this RF energy, as opposed to quenching it in certain embodiments of the present invention; thereby creating a resonant cavity for which, at certain frequencies, the response of the device to the modulation signal is different from desired. FIG. 9 depicts desired and undesired response of the device of FIG. 6 vs. modulation signal frequency. Curve 132 shows generally the modulation response of the device. Dips 134–138 and peak 140 in the response curve are the result of the parasitic RF modes traveling in the ground electrodes. These dips and peaks may or may not be at some multiple of a particular fundamental frequency.

As can be seen in FIGS. 4–6, the ground electrodes of the present optical modulator are typically much narrower than those of the prior art, making the present device more susceptible to the aforementioned problem in certain embodiments. The problem can be eliminated by connecting ground electrodes at various points to one another and to the package, as shown in FIG. 10.

Figure 10:
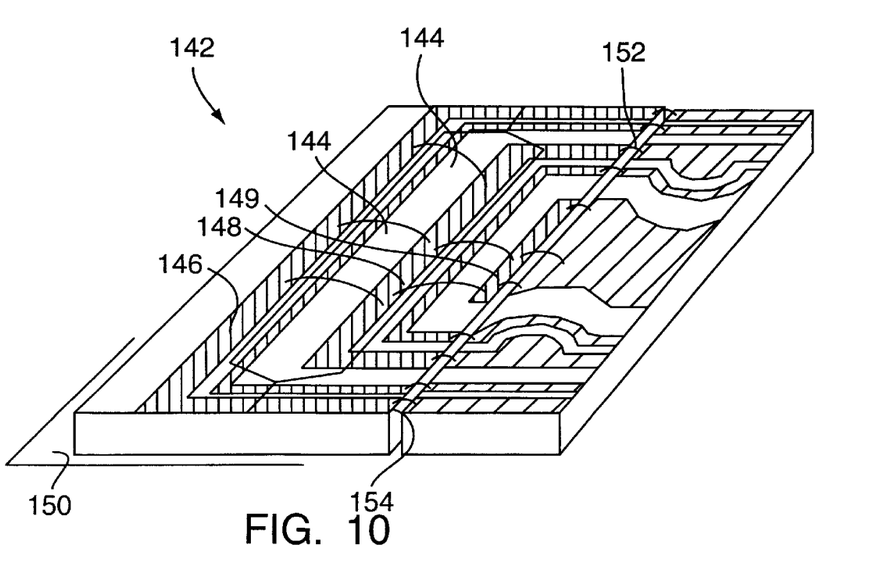
FIG. 10 is a top view of the optical modulator of FIG. 4 showing supplemental wire bonds used to reduce the parasitic RF modes in the modulation signal.

FIG. 10 is a top view of an optical modulator 142 provided according to the present invention showing supplemental wire bonds 144 used to reduce the parasitic RF modes in the modulation signal. The optical modulator 142 is substantially the same as the embodiment of the present optical modulator described with respect to FIG. 6. Ground electrodes 146–149 are interconnected between themselves and package surface 150 or an interface ground with on-chip wire bonds at the ¼, ½, and ¾ point along the length of the electrode. These low resistance wire bonds force the voltages on the ground electrodes to be the same and equal to the voltage on the package floor, at those particular points.

The wire bonds do not quench the parasitic microwave modes, but provide points of reflection for them. Without the on-chip wire bonds, the parasitic RF modes are reflected at the ends of the device (152, 154), where the ground electrodes are forced to the same voltage. The lowest frequency at which a dip or peak appears in the modulation response is inversely proportional to the length of electrode between reflection points. The on-chip wire bonds at the ½ point provide an additional reflection point, causing the first resonance frequency to double. The on-chip wire bonds at the ¼ and ¾ point cut the cavity length in two again, causing the first resonance frequency to double again. By placing wire bonds at enough locations along the ground electrodes, the resonances can be moved out of the frequency band of interest.

Another method to suppress the deleterious effects of parasitic RF modes is to simply avoid exciting them by using an improved RF interface structure, which launches the signal onto the hot electrode, yet prevents any differential voltage from appearing between any of the ground electrodes or between any of the ground electrodes and package floor. Both approaches may be used separately or together to mitigate the parasitic RF mode problem with the present optical modulator.

Launching a RF modulation signal into the modulator with a cascade probe (a test device which provides a nearly ideal RF launch condition) prevents parasitic modes from being excited, as is evidenced by the lack of undesired peaks and dips in the modulation response vs. frequency curve seen in FIG. 9. This result holds true even if the device is mounted in a package, where it is in close proximity to the package floor. A cascade launch has two beneficial characteristics: (1) the ground electrode adjacent to the hot being driven is kept at same potential as the package, (2) ground current loops, which help to excite parasitic modes, are minimized, as all ground currents must find their way to the cascade probe via wire bonds and other features which add inductance and thereby suppress the modes.

With a conventional package and RF interface structure, the ground currents may find a return path which has as low an inductance as the desired current path. This extraneous ground current in the package causes the package ground to have a voltage different from the ground electrodes on the modulator, giving rise to parasitic modes of the types detailed hereinabove. Hence, providing an ideal RF modulator signal launch has two components: (1) an electrode ground at the same potential as the package ground and (2) minimal extraneous ground currents through the metal walls of the package. The first component is difficult to address as wire bonds always have some inductance; allowing the two ground potentials to be slightly different. The second property is easier to achieve, by forcing the extraneous ground currents to take as long a path as possible.

Figure 11:
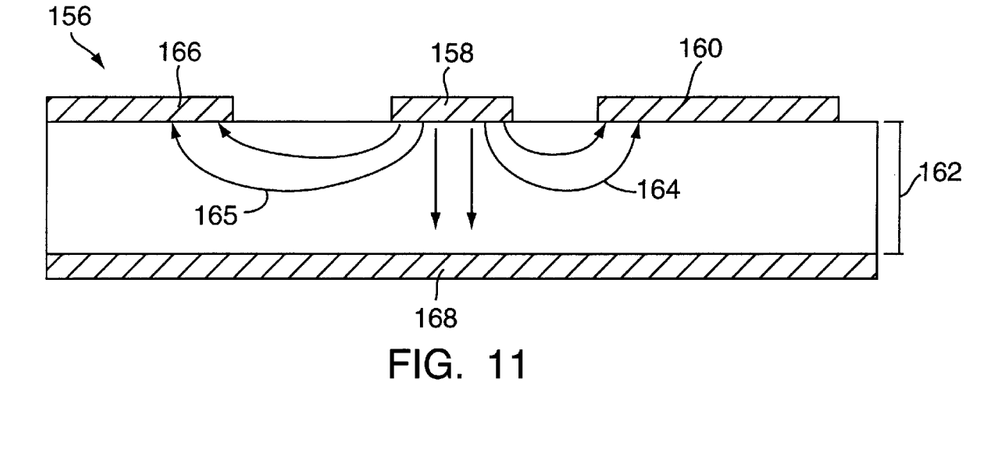
FIG. 11 is a simplified schematic illustration, in section, of a portion of a RF interface structure showing electric field paths within an optical modulator.

FIG. 11 illustrates a RF interface structure 156, used to launch the RF modulation signals onto the optical modulator. The gap between hot electrode 158 and nearest ground electrode 160 is of the same order as the thickness of the interface structure as indicated by arrow 162. The interface structure is typically made of a ceramic material. Note that electric field lines 164, 165 from the hot electrode 158 run over to both ground electrode 166 and 160 and metallization layer 168 on the bottom of the RF interface structure. The presence of electric field lines to ground electrode 166 and to metallization layer 168 result in ground currents in those locations, an undesired feature.

Figure 12:
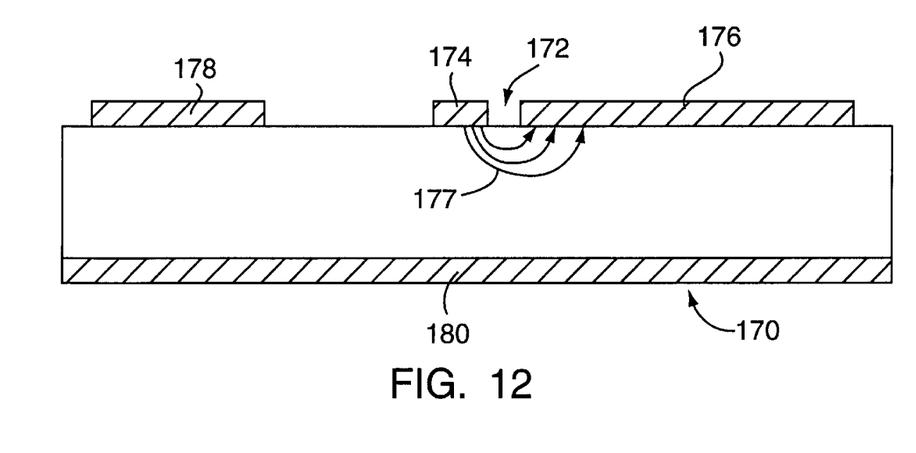
FIG. 12 is a simplified schematic illustration, in section, of a portion of a RF interface structure provided by the present invention showing electric field paths.

FIG. 12 is a simplified schematic illustration, in section, of a portion of a RF interface structure provided by the present invention showing electric field paths. Seen in FIG. 12 is an interface structure 170 having a small gap 172 between hot electrode 174 and adjacent ground electrode 176. The tight gap minimizes field lines 177 to ground electrode 178 and metallization layer 180 on the bottom interface structure surface, thereby reducing the ground currents in those locations. In other words, the interface structure does not support the presence of ground currents which are forced to take an electrically longer path.

Figure 13:
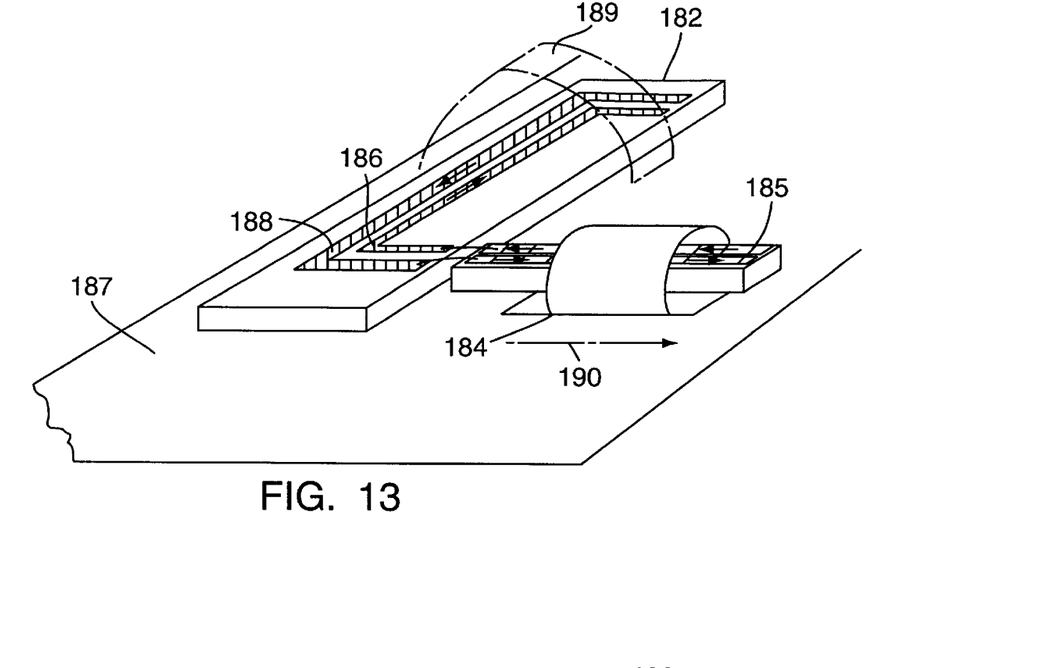
FIG. 13 is a simplified schematic illustration of a second alternative embodiment of an optical modulator made in accordance with the present invention.

FIG. 13 shows a simplified schematic illustration of a second alternative embodiment of a RF interface structure 182 made in accordance with the present invention. The interface structure is substantially similar to that shown in FIG. 12 or FIG. 11. Ground currents of the type detailed hereinabove can also be suppressed by placing a ferrite tube 184 around parts or all of the RF interface. Any current loops which enter via hot electrode 185 on top of the interface structure and return via the package wall or surface 187, create magnetic flux within the ferrite material as a consequence of Ampere's Law. The magnetic flux creates inductance and therefore a large RF energy loss for these current components, thereby quenching them. The same principle can be applied to the optical modulator itself. By placing a ferrite tube 189 (partially shown in phantom) around optical modulator, all ground currents are forced to return via the top surface electrodes (186, 188), and are prevented from returning via the package walls. In FIG. 13, dashed arrow 190 shows the location of ground current, which is quenched by the ferrite tube. Only one section of interface structure is shown. Only two of five electrodes on modulator are shown. The interface structure for the other input electrode and interface structures for the output structures are not shown.

One other parameter that must be addressed in optical modulator design is the bandwidth as is defined by the frequency response of the device. The optical modulator bandwidth is limited to a large extent by the difference in velocity between the optical and electrical signals traveling the length of the device. The velocity mismatch causes a phase mismatch between the two traveling signals (optical and electrical). This mismatch limits the maximum frequency of operation when a buffer layer is not employed. U.S. Pat. No. 4,448,479 discloses a device in which the device bandwidth can be extended by reversing the polarity of the electrodes at some point along its length. However, the teachings of the '479 patent are limited to that device. This patent does not suggest how to reverse polarity in the five electrode structure of the preferred embodiment.

Figure 14:
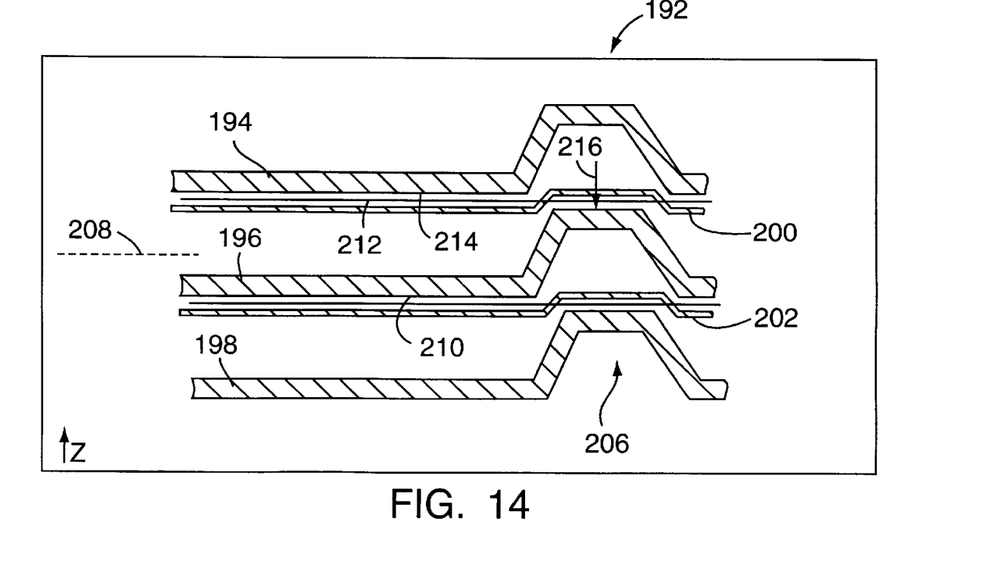
FIG. 14 is a top view of a portion of an electrode structure of an optical modulator made in accordance with the present invention having a phase reversal region.

FIG. 14 illustrates partially another alternative embodiment of the present invention having electrodes similar to those of the preferred embodiment but characterized by a phase reversal region. In FIG. 14 there is seen a top view of a portion of an electrode structure of an optical modulator 192 made in accordance with the present invention. Ground (194–198) and hot (200, 202) electrodes are laterally shifted across top surface 204 of the device in a phase reversal region 206 where electrode polarity is reversed with respect to crystal z axis in such a way as to preserve electrode impedance while reversing the polarity of the modulation signal as it traverses lengthwise along axis 208. The optical signals transit optical waveguides 210, 212. Arrows 214, 216 show the direction of the applied electric fields induced by the modulation signal.

Figure 15:
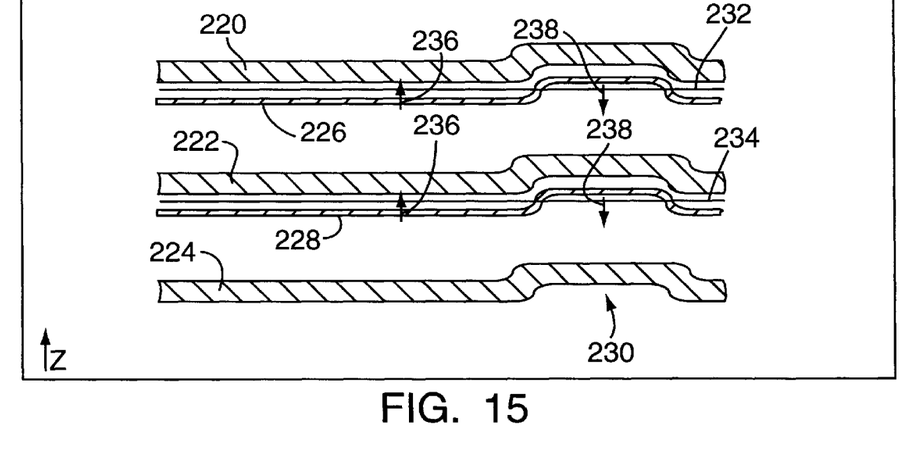
FIG. 15 is a top view of a portion of an electrode structure of an optical modulator made in accordance with the present invention having a phase reversal region utilizing five electrodes.

FIG. 15 shows an alternative approach to phase reversal than is presented by the embodiment of FIG. 14. In FIG. 15 there is seen a top view of a portion of an electrode structure of another optical modulator 218 made in accordance with the present invention which provides for phase reversal with five electrodes. In this approach all ground electrodes 220–224 and hot electrodes 226, 228 are shifted laterally by a small amount, creating a phase reversal region 230. Consequently, waveguides 232, 234 sample the fringing electric fields having opposing polarity. Arrows 236, 238 show the direction of the applied electric fields induced by the modulation signal.

Figure 16:
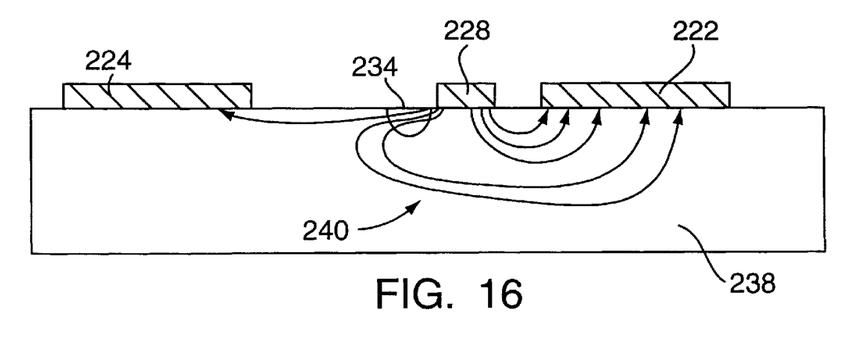
FIG. 16 provides a more detailed depiction of the electric fields in the vicinity of the hot electrode for an optical modulator as provided by the present invention.

An expectation from the optical modulator described with respect to FIG. 5 is that the direction of the applied electric fields in these locations would be very weak, making phase reversal impractical. However, the schematic illustration of FIG. 5 can be an over simplification. FIG. 16 provides a more detailed schematic depiction of the electric fields within the optical modulator 218 of FIG. 15. Shown in cross sectional view of hot electrode 228 and two nearest ground electrodes 222, 224, for phase reversal region 230 of the optical modulator 218. In the vicinity of the hot electrode 228 a subset 240 of the field lines immediately to the left of the hot electrode 228 loop back and terminate on the most adjacent ground electrode 222, rather than the more distant neighboring ground electrode 224. These field lines cause the electro-optic response induced in the optical signal traversing waveguide 234 to be larger than expected, even though signal polarity is reversed.

Similarly, although the invention has been shown and described with respect to a preferred embodiment thereof, it would be understood by those skilled in the art that other various changes omissions and additions thereto-may be made without departing from the spirit and scope of the present invention.

What is claimed is:

1. An electro-optic modulator for use in an optical communication system having an optical signal transiting therethrough, the modulator comprising:

an electro-optic substrate having an electro-optic axis oriented parallel to an upper surface of the substrate;

an optical waveguide adapted to receive the optical signal and formed in the upper surface of said substrate, said optical waveguide having first and second legs spaced from one another;

first and second input electrodes formed on said substrate upper surface and adapted to receive a modulation signal, with each of said input electrodes configured to be in electro-optic communication with a corresponding one of said optical waveguide legs but substantially misregistered therewith;

first and second ground electrodes formed on said substrate upper surface spaced from a respective one of said input electrodes and configured to be in electro-optic communication with a corresponding one of said optical waveguide legs but substantially misregistered therewith; and wherein said first input electrode is configured as a center electrode relative to said optical waveguide legs and said second input electrode is configured as an exterior electrode relative to said optical waveguide legs.

2. The electro-optic modulator of claim 1 wherein said substrate further comprises lithium niobate.

3. The electro-optic modulator of claim 2 wherein said substrate is fabricated from an X-cut lithium niobate crystal.

4. The electro-optic modulator of claim 1 wherein each of said input electrodes and a corresponding one of said ground electrodes are formed to be alongside a one of said optical waveguide legs.

5. The electro-optic modulator of claim 1 wherein said input electrodes present an electrical impedance in excess of 25 Ohms.

6. The electro-optic modulator of claim 1 wherein both of said input electrodes are configured to receive said modulation signals adjacent a selected one of said first and second optical waveguide legs.

7. The electro-optic modulator of claim 1 wherein said first and second input electrodes are configured to receive first and second modulation signals.

8. The electro-optic modulator of claim 1 wherein said input electrodes are configured relative to said ground electrodes to have a width ratio of approximately 1:3.

9. The electro-optic modulator of claim 1 wherein said input electrodes comprise coplanar waveguide electrodes (CPW).

10. An electro-optic modulator for use in an optical communication system having an optical signal transiting therethrough, the modulator comprising:
an electro-optic substrate having an electro-optic axis oriented parallel to an upper surface of the substrate;
an optical waveguide adapted to receive the optical signal and formed in the upper surface of said substrate, said optical waveguide having first and second legs spaced from one another;
first and second input electrodes formed on said substrate upper surface and adapted to receive a modulation signal, with each of said input electrodes configured to be in electro-optic communication with a corresponding one of said optical waveguide legs but substantially misregistered therewith;
first and second ground electrodes formed on said substrate upper surface spaced from a respective one of said input electrodes and configured to be in electro-optic communication with a corresponding one of said optical waveguide legs but substantially misregistered therewith; and
a supplemental ground electrode formed on said upper substrate surface to balance electrical impedances for said first and second input electrodes.

11. An electro-optic modulator for use in an optical communication system having an optical signal transiting therethrough, the modulator comprising:
an electro-optic substrate having an electro-optic axis oriented parallel to an upper surface of the substrate;
an optical waveguide adapted to receive the optical signal and formed in the upper surface of said substrate, said optical waveguide having first and second legs spaced from one another;
first and second input electrodes formed on said substrate upper surface and adapted to receive a modulation signal, with each of said input electrodes configured to be in electro-optic communication with a corresponding one of said optical waveguide legs but substantially misregistered therewith;
first and second ground electrodes formed on said substrate upper surface spaced from a respective one of said input electrodes and configured to be in electro-optic communication with a corresponding one of said optical waveguide legs but substantially misregistered therewith; and
wherein said input electrodes are configured serially along said optical waveguide first and second legs.

12. The electro-optic modulator of claim 11 further comprising a bias electrode.

13. An electro-optic modulation apparatus for modulating an optical signal transiting through an optical communication system, the apparatus comprising:
an optical modulator having
an electro-optic substrate having an electro-optic axis oriented parallel to an upper surface of the substrate;
an optical waveguide adapted to receive the optical signal and formed in the upper surface of said substrate, said optical waveguide having first and second legs spaced from one another;
first and second input electrodes formed on said substrate upper surface and adapted to receive a modulation signal, with each of said input electrodes configured to be in electro-optic communication with a corresponding one of said optical waveguide legs but substantially misregistered therewith;
first and second ground electrodes formed on said substrate upper surface spaced from a respective one of said input electrodes and configured to be in electro-optic communication with a corresponding one of said optical waveguide legs but substantially misregistered therewith;
an interface structure for receiving modulation signals for modulation the optical beam, said interface structure configured to be in electrical communication with said optical modulator first and second input electrodes; and
wherein said first input electrode is configured as a center electrode relative to said optical waveguide legs and said second input electrode is configured as an exterior electrode relative to said optical waveguide legs.

14. The electro-optic modulation apparatus of claim 13 wherein said interface structure further comprises a stripline.

15. The electro-optic modulation apparatus of claim 14 wherein said stripline further comprises a tapered stripline.

16. The electro-optic modulation apparatus of claim 13 further comprising an external conductor adapted to receive magnetic flux created by extraneous ground current outside of said ground electrodes, thereby creating a large RF energy loss for said extraneous ground current.

17. The electro-optic modulation apparatus of claim 16 wherein said external conductor further comprises a ferrite tube spaced from a portion of said electro-optic modulation apparatus.

18. An electro-optic modulation apparatus for modulating an optical signal transiting through an optical communication system, the apparatus comprising:
an optical modulator having
an electro-optic substrate having an electro-optic axis oriented parallel to an upper surface of the substrate;
an optical waveguide adapted to receive the optical signal and formed in the upper surface of said substrate, said optical waveguide having first and second legs spaced from one another;
first and second input electrodes formed on said substrate upper surface and adapted to receive a modulation signal, with each of said input electrodes configured to be in electro-optic communication with a corresponding one of said optical waveguide legs but substantially misregistered therewith; and first and second ground electrodes formed on said substrate upper surface spaced from a respective one of said input electrodes and configured to be in electro-optic communication with a corresponding one of said optical waveguide legs but substantially misregistered therewith;

an interface structure for receiving modulation signals for modulation the optical beam, said interface structure configured to be in electrical communication with said optical modulator first and second input electrodes; and wherein said interface structure further comprises a means for adjusting electrical impedance values for the apparatus.

19. The electro-optic modulation apparatus of claim 18 wherein said interface structure adjusting means comprises first and second RF signal paths of unequal length.

20. An electro-optic modulation apparatus for modulating an optical signal transiting through an optical communication system, the apparatus comprising:

an optical modulator having
an electro-optic substrate having an electro-optic axis oriented parallel to an upper surface of the substrate;
an optical waveguide adapted to receive the optical signal and formed in the upper surface of said substrate, said optical waveguide having first and second legs spaced from one another;
first and second input electrodes formed on said substrate upper surface and adapted to receive a modulation signal, with each of said input electrodes configured to be in electro-optic communication with a corresponding one of said optical waveguide legs but substantially misregistered therewith;
first and second ground electrodes formed on said substrate upper surface spaced from a respective one of said input electrodes and configured to be in electro-optic communication with a corresponding one of said optical waveguide legs but substantially misregistered therewith;

an interface structure for receiving modulation signals for modulation of the optical beam, said interface structure configured to be in electrical communication with said optical modulator first and second input electrodes, said interface structure further comprising a stripline, and wherein said interface structure stripline further comprises a Y shaped conductor.

21. The electro-optic modulation apparatus of claim 20 wherein said input electrodes each further comprise first and second regions separated by an electrical ground.

22. An electro-optic modulator for use in an optical communication system having an optical signal transiting therethrough, the modulator comprising:

an electro-optic substrate having an electro-optic axis oriented parallel to an upper surface of the substrate;
an optical waveguide adapted to receive the optical signal and formed in the upper surface of said substrate, said optical waveguide having first and second legs spaced from one another;
first and second input electrodes formed on said substrate upper surface and adapted to receive a modulation signal, with each of said input electrodes configured to be in electro-optic communication with a corresponding one of said optical waveguide legs but substantially misregistered therewith;
first and second ground electrodes formed on said substrate upper surface spaced from a respective one of said input electrodes and configured to be in electro-optic communication with a corresponding one of said optical waveguide legs but substantially misregistered therewith; and a means for minimizing extraneous ground current outside of said ground electrodes.

23. The electro-optic modulator of claim 22 wherein said ground current minimizing means further comprises a conductive electrical path formed between said first and second ground electrodes at a position therealong selected to cause the frequency of said extraneous ground current to increase beyond the frequency of said modulation signal.

24. The electro-optic modulator of claim 23 wherein said conductive electrical path comprises a wire bond.

25. An electro-optic modulation apparatus for modulating an optical signal transiting through an optical communication system, the apparatus comprising:

an optical modulator having
an electro-optic substrate having an electro-optic axis oriented parallel to an upper surface of the substrate;
an optical waveguide adapted to receive the optical signal and formed in the upper surface of said substrate, said optical waveguide having first and second legs spaced from one another;
first and second input electrodes formed on said substrate upper surface and adapted to receive a modulation signal, with each of said input electrodes configured to be in electro-optic communication with a corresponding one of said optical waveguide legs but substantially misregistered therewith; and
first and second ground electrodes formed on said substrate upper surface spaced from a respective one of said input electrodes and configured to be in electro-optic communication with a corresponding one of said optical waveguide legs but substantially misregistered therewith; and an interface structure for receiving modulation signals for modulation of the optical beam, said interface structure configured to be in electrical communication with said optical modulator first and second input electrodes; and a means for providing a cascade launch of said modulation signal.

26. An electro-optic modulator for use in an optical communication system having an optical signal transiting therethrough, the modulator comprising:

an electro-optic substrate having an electro-optic axis oriented parallel to an upper surface of the substrate;
an optical waveguide adapted to receive the optical signal and formed in the upper surface of said substrate, said optical waveguide having first and second legs spaced from one another;
first and second input electrodes formed on said substrate upper surface and adapted to receive a modulation signal, with each of said input electrodes configured to be in electro-optic communication with a corresponding one of said optical waveguide legs but substantially misregistered therewith;
first and second ground electrodes formed on said substrate upper surface spaced from a respective one of said input electrodes and configured to be in electro-optic communication with a corresponding one of said optical waveguide legs but substantially misregistered therewith; and
a phase reversal region wherein minor portions of said input and ground electrodes are symmetrically displaced laterally from major portions thereof along said substrate upper surface so as to maintain electrode impedance.

27. The electro-optic modulator of claim 26 wherein said phase reversal region lateral displacement has a magnitude so as to sample fringing electric fields having opposing polarity induced within said substrate.

28. An electro-optic modulator for use in an optical communication system having an optical signal transiting therethrough, the modulator comprising:

an electro-optic substrate having an electro-optic axis oriented parallel to an upper surface of the substrate;

an optical waveguide adapted to receive the optical signal and formed in the upper surface of said substrate, said optical waveguide having first and second legs spaced from one another;

first and second input electrodes formed on said substrate upper surface and adapted to receive a modulation signal, with each of said input electrodes configured to be in electro-optic communication with a corresponding one of said optical waveguide legs but substantially misregistered therewith;

first and second ground electrodes formed on said substrate upper surface spaced from a respective one of said input electrodes and configured to be in electro-optic communication with a corresponding one of said optical waveguide legs but substantially misregistered therewith; and a means for maintaining said ground electrodes at the same voltage.

* * * * *